(12) United States Patent  (10) Patent No.: US 6,522,797 B1
Siems et al.  (45) Date of Patent: Feb. 18, 2003

(54) SEISMIC OPTICAL ACOUSTIC RECURSIVE SENSOR SYSTEM

(75) Inventors: Lee E. Siems, Simonton, TX (US); Grevson Knapp, Houston, TX (US); John Maida, Houston, TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 09/144,953

(22) Filed: Sep. 1, 1998

(Under 37 CFR 1.47)

(51) Int. Cl.$^7$ .................................................. G02B 6/00
(52) U.S. Cl. ...................... 385/12; 385/13; 250/227.14; 250/227.16; 356/477; 356/478
(58) Field of Search ............................. 385/12, 13, 14; 250/227.14, 227.16, 227.12; 356/477, 478

(56) References Cited

U.S. PATENT DOCUMENTS

| | | |
|---|---|---|
| 3,458,257 A | 7/1969 | Pryor |
| 4,123,158 A | 10/1978 | Reytblatt |
| 4,295,739 A | 10/1981 | Meltz et al. |
| 4,322,829 A | 3/1982 | Davis, Jr. et al. |
| 4,474,427 A | 10/1984 | Hill et al. |
| 4,487,474 A | 12/1984 | Nishie et al. |
| 4,525,818 A | 7/1985 | Cielo et al. |
| 4,534,222 A | 8/1985 | Finch et al. |
| 4,568,408 A | 2/1986 | Schmadel et al. |
| 4,577,100 A | 3/1986 | Meltz et al. |
| 4,577,414 A | 3/1986 | Migliori et al. |
| 4,649,529 A * | 3/1987 | Avicola ....................... 367/149 |
| 4,653,906 A | 3/1987 | Dunphy et al. |
| 4,653,916 A | 3/1987 | Henning et al. |
| 4,654,520 A | 3/1987 | Griffiths |
| 4,673,299 A | 6/1987 | Dakin |
| 4,678,905 A | 7/1987 | Phillips |
| 4,688,200 A | 8/1987 | Poorman |
| 4,692,610 A | 9/1987 | Szuchy |
| 4,717,253 A | 1/1988 | Pratt, Jr. |
| 4,725,110 A | 2/1988 | Glenn et al. |
| H474 H | 6/1988 | Taylor |
| 4,761,073 A | 8/1988 | Meltz et al. |
| 4,763,009 A | 8/1988 | Fevrier et al. |
| 4,770,535 A * | 9/1988 | Kim et al. ................... 356/345 |
| 4,775,214 A | 10/1988 | Johnson |
| 4,787,741 A | 11/1988 | Udd et al. |
| 4,789,241 A | 12/1988 | Michal et al. |
| 4,799,752 A | 1/1989 | Carome |
| 4,800,266 A | 1/1989 | Poorman |
| 4,806,012 A | 2/1989 | Meltz et al. |

(List continued on next page.)

OTHER PUBLICATIONS

A. D. Kersey et al., *Tapped Serial Interferometric Fiber Sensor Array with Time Division Multiplexing*, Optical Techniques Branch (Code 6570), Naval Research Laboratory, pp. 80–82.

(List continued on next page.)

*Primary Examiner*—Hemang Sanghavi
*Assistant Examiner*—Scott Knauss
(74) *Attorney, Agent, or Firm*—Madan, Mossman & Sriram, P.C.

(57) ABSTRACT

A marine seismic fiber optic acoustic sensor system having internal mirrors with a low reflectivity written into the fiber to form a series of continuous, linear sensors incorporated in a single fiber, each sensor bounded by a pair of internal mirrors. A pulsed laser provides optical signals to the fiber at a pulse width less than twice the travel time to assure that there will be no phase or frequency modulation of signals returned from the sensors and reflected optical energy is returned through the same fiber to an optical coupler where it is input to a compensating interferometer to produce interference signals which are then time division multiplexed to produce signals corresponding to acoustic signals received by each mirror bound sensor. Calibration to remove local temperature effects is provided by using a desensitized reference fiber with internal mirrors identical to the sensitized fiber, by a piezoelectric stretcher built into the fiber or any other conventional calibration technique.

30 Claims, 9 Drawing Sheets

U.S. PATENT DOCUMENTS

| | | | |
|---|---|---|---|
| 4,807,950 A | 2/1989 | Glenn et al. | |
| 4,812,645 A | 3/1989 | Griffiths | |
| 4,834,493 A | 5/1989 | Cahill et al. | |
| 4,836,637 A | 6/1989 | Poorman et al. | |
| 4,848,999 A | 7/1989 | Taylor | |
| 4,892,388 A | 1/1990 | Taylor | |
| 4,893,930 A | 1/1990 | Garrett et al. | |
| 4,904,864 A | 2/1990 | Dakin et al. | |
| 4,923,273 A | 5/1990 | Taylor | |
| 4,927,232 A | 5/1990 | Griffiths | |
| 4,983,024 A | 1/1991 | Boothroyd et al. | |
| 4,994,791 A | 2/1991 | Taylor | |
| 4,996,419 A * | 2/1991 | Morey | 250/227.18 |
| 5,007,705 A | 4/1991 | Morey et al. | |
| 5,026,141 A | 6/1991 | Griffiths | |
| 5,042,897 A | 8/1991 | Meltz et al. | |
| 5,044,205 A | 9/1991 | Wolff et al. | |
| 5,045,691 A | 9/1991 | Steward et al. | |
| 5,048,913 A | 9/1991 | Glenn et al. | |
| 5,051,965 A | 9/1991 | Poorman | |
| 5,061,032 A | 10/1991 | Meltz et al. | |
| 5,104,209 A | 4/1992 | Hill et al. | |
| 5,111,466 A | 5/1992 | Normandin et al. | |
| 5,140,559 A | 8/1992 | Fisher | |
| 5,157,457 A | 10/1992 | Taylor | |
| 5,173,743 A | 12/1992 | Kim | |
| 5,208,877 A | 5/1993 | Murphy et al. | |
| 5,216,739 A | 6/1993 | Hill et al. | |
| 5,237,630 A | 8/1993 | Hogg et al. | |
| 5,250,802 A | 10/1993 | Runner | |
| 5,280,172 A | 1/1994 | Di Bin et al. | |
| 5,283,852 A | 2/1994 | Gibler et al. | |
| 5,313,266 A * | 5/1994 | Keolian et al. | 356/345 |
| 5,319,435 A | 6/1994 | Melle et al. | |
| 5,345,456 A | 9/1994 | Dai et al. | |
| 5,351,324 A | 9/1994 | Forman | |
| 5,361,383 A | 11/1994 | Chang et al. | |
| 5,367,588 A | 11/1994 | Hill et al. | |
| 5,380,995 A | 1/1995 | Udd et al. | |
| 5,384,884 A | 1/1995 | Kashyap et al. | |
| 5,394,488 A | 2/1995 | Fernald et al. | |
| 5,397,891 A | 3/1995 | Udd et al. | |
| 5,400,422 A | 3/1995 | Askins et al. | |
| 5,401,956 A | 3/1995 | Dunphy et al. | |
| 5,410,404 A | 4/1995 | Kersey et al. | |
| 5,420,688 A | 5/1995 | Farah | |
| 5,426,297 A | 6/1995 | Dunphy et al. | |
| 5,452,087 A | 9/1995 | Taylor et al. | |
| 5,493,390 A | 2/1996 | Varasi et al. | |
| 5,530,666 A | 6/1996 | Kashyap et al. | |
| 5,550,654 A | 8/1996 | Erdogan et al. | |
| 5,557,406 A | 9/1996 | Taylor et al. | |
| 5,581,639 A | 12/1996 | Davies et al. | |
| 5,591,965 A | 1/1997 | Udd | |
| 5,604,629 A | 2/1997 | Hunter et al. | |
| 5,620,495 A | 4/1997 | Aspell et al. | |
| 5,620,496 A | 4/1997 | Erdogan et al. | |
| 5,625,472 A | 4/1997 | Mizrahi et al. | |
| 5,633,748 A | 5/1997 | Perez et al. | |
| 5,633,960 A | 5/1997 | Lagakos et al. | |
| 5,636,304 A | 6/1997 | Mizrahi et al. | |
| 5,641,956 A | 6/1997 | Vengsarkar et al. | |
| 5,646,401 A | 7/1997 | Udd | |
| 5,657,406 A | 8/1997 | Ball | |
| 5,666,372 A | 9/1997 | Ball et al. | |
| 5,675,674 A * | 10/1997 | Weis | 250/227.18 |
| 5,680,489 A * | 10/1997 | Kersey | 356/35.5 |
| 5,684,297 A | 11/1997 | Tardy | |
| 5,694,248 A | 12/1997 | Erdogan et al. | |
| 5,694,502 A | 12/1997 | Bryron | |
| 5,694,503 A | 12/1997 | Fleming et al. | |
| 5,698,848 A * | 12/1997 | Belk | 250/227.11 |
| 5,706,079 A | 1/1998 | Kersey | |
| 5,708,498 A | 1/1998 | Rioux et al. | |
| 5,712,715 A | 1/1998 | Erdogan et al. | |
| 5,714,680 A | 2/1998 | Taylor et al. | |
| 5,718,738 A | 2/1998 | Kohnke et al. | |
| 5,723,857 A | 3/1998 | Underwood et al. | |
| 5,745,615 A | 4/1998 | Atkins et al. | |
| 5,760,391 A | 6/1998 | Narendran | |
| 5,767,411 A | 6/1998 | Maron | |
| 5,770,155 A | 6/1998 | Dunphy et al. | |
| 5,773,486 A | 6/1998 | Chandross et al. | |
| 5,787,213 A | 7/1998 | Brownlow | |
| 5,808,779 A | 9/1998 | Weis | |
| 5,818,585 A * | 10/1998 | Davis et al. | 356/345 |
| 5,987,197 A * | 11/1999 | Kersey | 250/227.23 |
| 6,072,567 A * | 6/2000 | Sapack | 356/32 |

OTHER PUBLICATIONS

Behzad Moslehi et al., *Efficient Fiber–Optic Structure with Applications to Sensor Arrays*, Feb. 1989, vol. 7, No. 2, Journal of Lightwave Technology, pp. 236–242.

Input/Output, Inc, *I/O Digital Streamer Marine Data Acquisition System*, 1995.

Charles Davis et al., *Fiberoptic Sensor Technology Handbook*, 1986, Copyright No. TX 1–094–758, Chapters 1–6 and Appendix A.

David A. Brown et al., *A Symmetric 3×3 Coupler Based Demodulator For Fiber Optic Interferometric Sensors*, pp. 1–8, SPIE 1991, Paper 1584–41.

K.P. Koo et al., *Passive Stabilization Scheme for Fiber Interferometers Using (3×3) Fiber Directional Couplers*, pp. 616–618, Appl. Phys. Lett. 41(7), Oct. 1, 1982.

David A. Krohn, *Sensors: Two Ways of Sensing with Fibers for Two Kinds of Applications*, 1995, H–169–H175, Photonics Design and Applications Handbook.

John Wiley & Sons, Inc., *Fiber Optic Sensors*, 1991, pp. 271–323.

The International Society for Optical Engineering, *Fiber Optic and Laser Sensors VIII*, Sep. 17–19, 1990, vol. 1367, pp. 13–29, Proceedings Reprint by Society of Photo–Optical Instrumentation Engineers.

Donald A. Danielson et al., *Fiber–Optic Ellipsoidal Flextensional Hydrophones*, Dec., 1989, vol. 7, No. 12, Journal Of Lightwave Technology.

D. L. Gardner et al., *A Fiber–Optic Interferometric Seismometer*, Jul, 1987, vol. LT–5, No. 7, pp. 953–959, Journal Of Lightwave Technology.

Thomas J. Hofler et al., *Thermal Noise in a Fiber Optic Sensor*, pp. 471–475, J. Acoust. Soc. Am. 84(2), Aug. 1988.

A.D. Kersey et al., *Cross Talk in a Fiber–Optic Fabry–Perot Sensor Array with Ring Reflectors*, pp. 93–95, Optics Letters, Jan. 1, 1989.

Alan D. Kersey et al., *Distributed and Multiplexed Fiber Optic Sensors*, Sep. 5, 1991, pp. 1–140, Short Course Notes SC39.

Vikram Bhatia et al., *A Comparative Evaluation Of The Types And Applications Of Various Sensors*, 1995, pp. H–164–H176, The Phototonics Design And Applications Handbook.

C.M. Crooker et al., *Fiber Optic And Laser Sensors V*, Aug, 17–19, 1987, SPIE vol. 838, pp. 329–331.

* cited by examiner

SEISMIC OPTICAL ACOUSTIC RECURSIVE SENSOR SYSTEM

BACKGROUND OF THE INVENTION

This invention relates to fiber optic sensors and, more particularly, to marine seismic streamers using optical fibers for sensing changes in acoustic fields.

Marine seismic sensing devices are known that utilize discrete optical hydrophones which are assembled into marine seismic streamers. The discrete hydrophones use a pulsed laser to provide light to hydrophones made of optical fiber wound around mandrels. Pressure changes about a hydrophone cause deformations, which in turn cause phase and frequency modulation of light traveling through the fibers within each discrete hydrophone. Those changes are recorded as interference patterns produced at each discrete sensor. The individual interference patterns are coupled to a return cable to return to the shipboard for processing. Discrete optical hydrophones require a significant amount of fabrication, because each hydrophone must be spliced to optical coupler and return fibers, and the whole assembly encased and inserted into a hydrophone streamer skeleton. Marine seismic streamers of such individual sensors are bulky and expensive to fabricate.

Alternate types of optical hydrophone streamer systems are also known that utilize a streamer with discrete optical hydrophone sensors that operate by phase and intensity modulation of laser light input. Each sensor includes a mandrel-wound section of fiber coupled to two tails of optical fiber, each tail ending in an internal mirror. In this approach, light is reflected back and forth between the tails to produce phase and intensity modulation of the optical signal in response to sensed local acoustic pressure change. These two-tail systems have not been considered practical or economical for use in marine seismic streamers.

Such conventional optical sensing systems are limited in their application by cross talk effects. For example, if the width of the pulse is less than the round-trip optical propagation delay in each sensor element, the output obtained through the optical coupler consists of a series of N+1 pulses that are separated in the time domain. Apart from cross-talk effects, these pulses contain no direct interferometric information. Application of this pulse train to a compensating interferometer of optical imbalance 2L coherently mixes pulses obtained from consecutive reflectors, thus generating the interferometric outputs from each sensor element. Cross talk occurs between optical sensors due to multiple reflection paths. The cross talk manifests itself as side-bands in a heterodyne modulation and demodulation. In seismic acquisition, cross-talk of acoustic signals between sensors is highly deleterious to processing data. It is generally accepted that these crossfeed products must be kept below −90 dB in order to provide quality seismic data. To achieve this level of crossfeed the reflectivity of the mirrors would have to be so low that there would be inadequate returned optical power to process.

The present invention is directed to providing seismic optical sensor systems that overcome the limitations of existing systems.

SUMMARY OF THE INVENTION

According to one aspect of the present invention, an optical sensor system for seismic exploration is provided that includes a single mode optical fiber, an optical coupler, a pulsed laser, and a compensating interferometer. The optical fiber is mounted within a linear casing and includes an input end and an opposite terminal end. The optical fiber further includes a plurality of partially reflective internal mirrors incorporated into the optical fiber at predetermined spaced intervals within the optical fiber with each pair adjacent mirrors defining a long gauge, linear, acoustic sensor. The optical coupler is coupled to the input end of the optical fiber and includes a first and a second output port. The pulsed laser is optically coupled to the first output port of the optical coupler and is adapted to provide an optical pulse width equal to or less than twice the one way time of travel of optical energy between the predetermined mirror intervals of the optical fiber. The compensating interferometer is optically coupled to the second output port of the optical coupler for receiving optical energy reflected from the internal mirror and includes a first path and a second path. The second path of the compensating interferometer includes a time delay equal to the two way time of travel of optical energy between the predetermined mirror intervals of the optical fiber.

According to another aspect of the present invention, an optical sensor system for seismic exploration is provided including a single mode optical fiber, a separate optical coupler, a pulsed laser, and a compensating interferometer. The single mode fiber is mounted within a linear, pressure sensitive casing, to form a continuous linear acoustic sensor. The single mode fiber includes an input end, an opposite terminal end, and at least two spaced apart, two-by-two, ratio optical couplers positioned between the fiber's input end and the fiber's terminal end. Each ratio optical coupler includes an input fiber having a non-reflective terminal end and an output fiber having a reflective terminal end. The separate optical coupler is coupled to the input end of the single mode fiber and includes a first and a second output port. The pulsed laser is optically coupled to the first output port of the separate optical coupler and is adapted to provide an optical pulse width equal to or less than twice the time of travel of optical energy between the intervals between reflective terminal ends of the ratio optical couplers. The compensating interferometer is optically coupled to the second output port of the separate optical coupler for receiving optical energy reflected from the reflective terminal ends of the ratio optical couplers. The compensating interferometer includes a first path and a second path. The second path includes a time delay equal to the two way time of travel of optical energy between the reflective terminal ends of the ratio optical couplers.

According to another aspect of the present invention, a method of processing data obtained from a hydrophone streamer is provided for a hydrophone streamer that includes: a series of linear, continuous, long gauge, optical fiber hydrophones, wherein each optical hydrophone is bounded by a pair of internal mirrors within the optical fiber, wherein each hydrophone includes a terminal internal mirror for reflecting a first portion of a pulsed optical signal back through the hydrophone to the signal source and for reflecting a second portion of the reflected optical signal back through the fiber to an interferometer coupled to first, second and third photo detectors and to a three-by-three optical coupler. The method includes subtracting signals from the first and second photo detectors from one another, adding signals from the second and third photo detectors, and transforming the rectangular coordinate data in the added and subtracted signals to polar coordinate data.

According to another aspect of the present invention, a pulsed laser is provided that includes a laser having an output port, and an optical switch operably coupled to the output port of the laser.

According to another aspect of the present invention, an optical switch is provided that includes a first single polarization fiber, a polarization scrambler, and a second apolarization fiber. The polarization scrambler has an input port and an output port. The input port of the polarization scrambler is operably coupled to the first single polarization fiber. The second single polarization fiber is operably coupled to the output port of the polarization scrambler.

DETAILED DESCRIPTION OF THE ILLUSTRATIVE EMBODIMENTS

Figure 1:
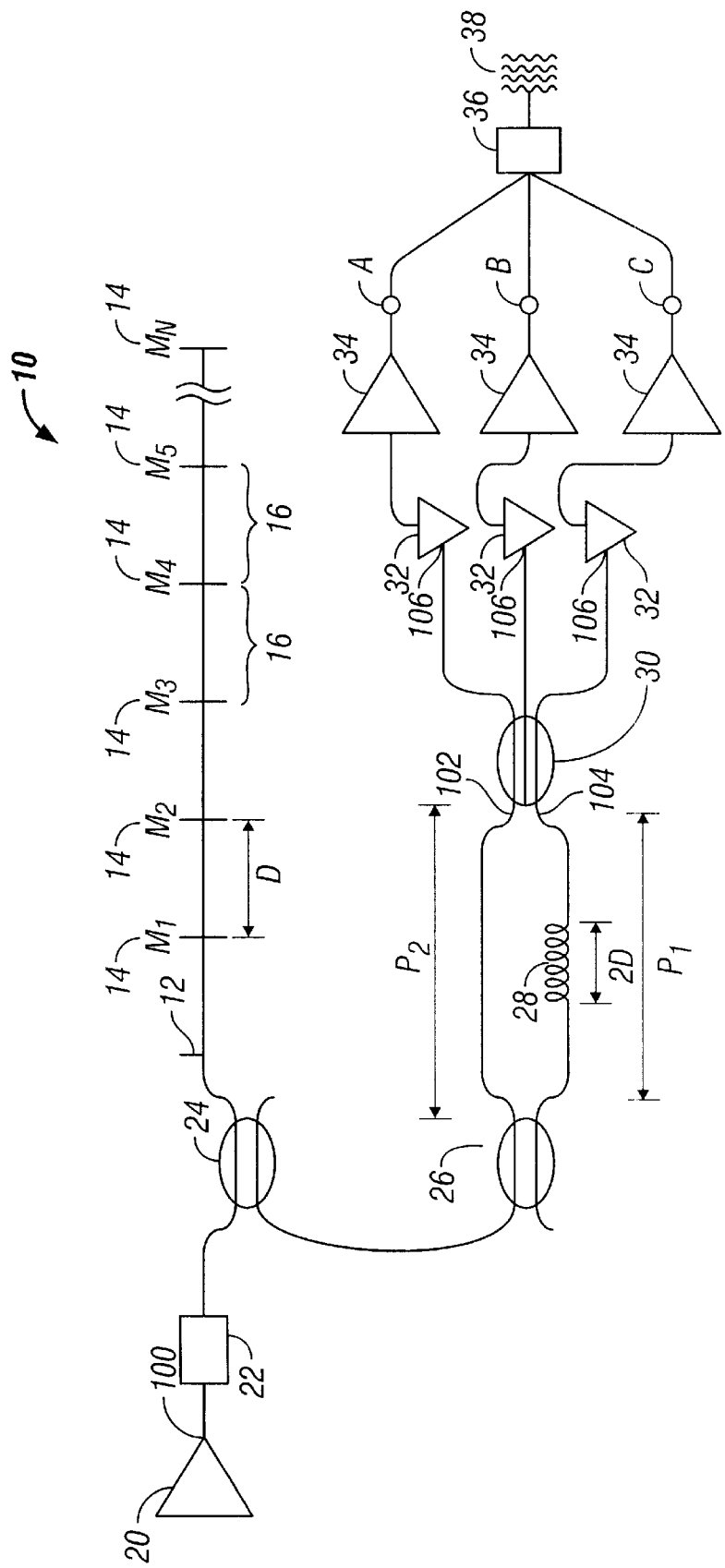
FIG. 1 is a schematic diagram of an embodiment of a continuous linear optical sensor system using reflectors within a single fiber to produce reflected pulses, illustrating the use of all sensitized sensors with each sensor as a reference for the immediately preceding sensor.

Referring to FIG. 1, a sensor system 10 includes a single mode optical fiber 12, intrinsic fiber mirrors 14, hydrophone sensors 16, a pulsed laser 20, polarization controller 22, optical coupler 24, optical coupler 26, optical delay coil 28, optical coupler 30, photodiodes 32, photodetectors 34, and a processor 36.

The intrinsic fiber mirrors 14 (shown as $M_1$, $M_2$, $M_3$... $M_N$.) are preferably written into the fiber 12. The single mode fiber 12 may comprise any number of commercially available single mode optical fibers such as, for example, SMF28. These mirrors 14 can be created by any conventional process for writing mirrors into fibers, such as vapor deposition or a photo process. The intrinsic fiber mirrors 14 are written into the fiber 12 at spaced intervals D, with each interval section of the mirror-bounded fiber forming a hydrophone sensor 16. For example, FFPI Industries of Bryan, Tex., Gec-Marconi, 3M, and Northern Photonics sell fibers having suitable mirrors. In addition, U.S. Pat. No. 4,923,273, assigned to Texas A&M University, discloses a process, suitable for the present embodiments, for writing suitable mirrors into such fibers.

The intrinsic fiber mirrors 14 are partially reflective so that, at each of the mirrors 14, a portion of light is reflected back through the fiber 12, and a portion moves forward on to the next mirror. The fiber 12 is wavelength dependent, and the mirrors are chosen to be reflective at a wavelength at which the optical energy loss due to refraction is minimal, such as, for example, a wavelength of 1550 nanometers ("nm"). The reflectivity of each of the intrinsic fiber mirrors 14 is preferably low, less than, for example, 0.5%, to minimize optical energy loss from multiple reflections between mirrors 14, as the optical energy pulse travels down the fiber 12, serially through each mirror-bounded sensor, while at the same time maximizing the return energy from each mirror-bounded sensor.

To enhance acoustic sensitivity of the sensors, and provide robustness, the sensing fiber 12 is preferably encased in a flexible, resilient material, called Hytrel, made by DuPont. However, the encasing material could also be Sanaprene, made by Monsanto, or be any other of the rubber synthetics that can be extruded onto a fiber. The sensing fiber 12 is further acoustically enhanced by extruding a layer of silicone over the glass cladding, and then extruding a layer of Teflon™ over the silicone. The fiber 12 is typically about 400 meters long, but can be of any practical length, up to about 10 kilometers.

The spacing between mirrors is typically 12.5 meters, and the fiber transmission speed is typically five nanoseconds ("ns") per meter. The time for the light pulse to travel the distance D between adjacent mirrors is typically less than sixty-two and one-half ns, that time being the acoustic aperture for each of the sensors 16.

A pulsed laser 20 generates optical pulses to provide the energy to the fiber 12. The pulsed laser 20 may comprise a commercially available components such as a PLD Series 500 laser driver manufactured by Wavelength Electronics, a pulse generator such as a Tektronics PG 501, and a laser diode such as the Rockwell 1.3μm laser diode.

Figure 1A:
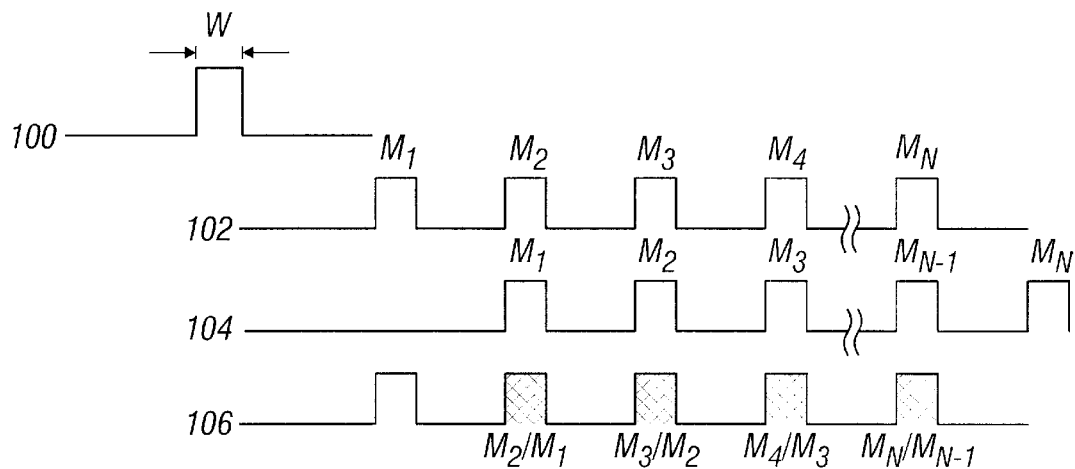
FIG. 1A is a schematic illustration of reflected pulses interference in the sensor system of FIG. 1.
Figure 1B:
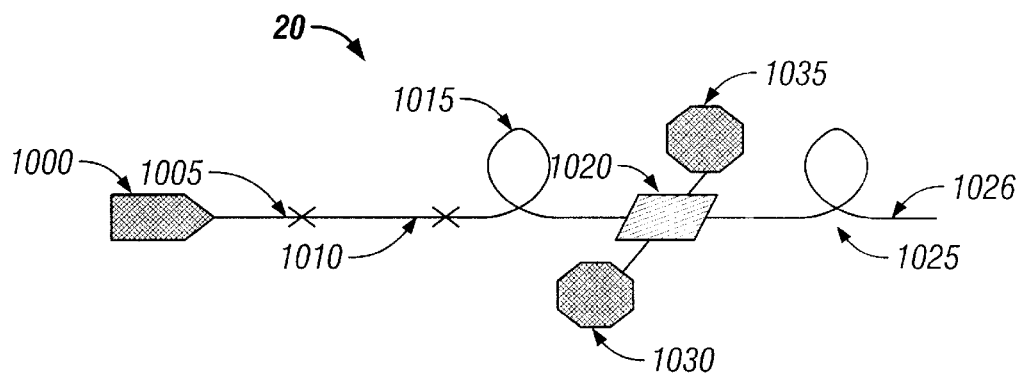
FIG. 1B is a schematic diagram of a preferred embodiment of a pulsed laser and an optical switch.

Referring to FIG. 1b, in a preferred embodiment, the pulsed laser 20 comprises a Nd:Yag ring laser 1000 with a PM fiber pigtail 1005, a random length of PM fiber 1010, 3 meters of a single polarization fiber 1015, a polarization controller 1020, and another 3 meters of a single polarization fiber 1025. The output of the laser 1000 is coupled to the input of the polarization controller 1020 by the PM fiber pigtail 1005 and the single polarization fiber 1010. The output of the polarization controller 1020 is coupled to the output 1026 of the pulsed laser 20 by the single polarization fiber 1025. The polarization controller 1020 may comprise a manual or an automatic polarization controller. In a particularly preferred embodiment, the polarization controller 1020 comprises a polarization scrambler. In a particularly preferred embodiment, the single polarization fibers 1005 and 1015 are pigtailed in 3 meter lengths to the input and output ports of the LiNbO$_3$ substrate of the polarization scrambler 1020, respectively.

When a ramp voltage 1030 is applied to the Vπ electrode of the polarization scrambler 1020, the polarization vector will swing through a predetermined degree range. The output light will be completely extinguished until the polarization aligns with the input and output single polarization fiber ports. This provides a pulsed light with high extinction ratios, low loss, and the ability to operate over a broad range of wavelengths. Furthermore, the combination of the single polarization fibers 1015 and 1025 and the polarization scrambler 1020 provides a robust optical switch. In a particularly preferred embodiment, the bias voltage 1035 of the LiNbO$_3$ substrate of the polarization scrambler 1020 is controlled to maintain the maximum contrast between the V$\pi$ and the V$_O$ voltage levels.

In a particularly preferred embodiment, the ring laser 1000 comprises a model number M125-1319-200 ring laser manufactured by Lightwave Electronics, the single polarization fibers 1015 and 1025 comprise 3 meter lengths of PZ series fibers manufactured by the 3M Corporation, and the polarization scrambler 1020 comprises a series 900–100 MHz Low Speed Polarization Scrambler manufactured by the Ramar Corporation.

The pulsed laser 20 is preferably selected to provide a pulse length equal to or less than twice the time for a light pulse to travel the distance D between the intrinsic fiber mirrors 14, and preferably is chosen to have a coherence length equal to about the typical fabrication error in the distance D. In a preferred embodiment, an electro-optic polarization controller 22 connected to the pulsed laser 20 removes the effects of polarization. The electro-optic polarization controller 22 couples to the fiber 12 via an optical coupler 24. In a preferred embodiment, the polarization controller 22 comprises a Polarization Scrambler available from the Ramar Corporation as part number 900-100-15.

The optical coupler 24 may comprise a two-by-two optical coupler. That is, when light returned from the single fiber 12 enters the optical coupler 24, the optical coupler 24 directs 50% of the returned light back to the pulsed laser 20, and the other 50% to a second optical optical coupler 26. In a particularly preferred embodiment, the optical coupler 24 is a two-by-two balanced optical coupler available from M.P. Fiber Optics as part number SA 15500202ABONE.

The optical coupler 26 may comprise a two-by-two optical coupler which splits the light from the optical coupler 24 again so that 50% goes along path P1 through a delay coil 28 to a third optical coupler 30, and the other 50% goes along path P2 directly, without delay, to the optical coupler 30. In a preferred embodiment, the optical coupler 26 is a two-by-two balanced optical coupler available from M.P. Fiber Optics as part number SA 15500202ABONE.

The optical coupler 30 may comprise a three-by-three optical coupler. The paths P1 and P2 function as the two arms of a compensating interferometer, preferably a Mach Zehnder interferometer, to provide interference signals to photo diodes 32. In a particularly preferred embodiment, the optical coupler 30 is a three-by-three balanced optical coupler available from M.P. Fiber Optics as part number SA 15000303BONE.

To extract data from the interference patterns, the three-by-three optical coupler 30 not only divides the received light in thirds, but it also creates a phase difference of about 120 degrees between the light pulses at each of its outputs. These optical signals are then supplied to photo detectors 34, which generate electrical signals A, B, and C. In a preferred embodiment, the photo detectors 34 comprise pin diodes available from PD LD Inc. as part number PID-DIN-075-TL7-1FA. In this manner, the optical coupler 30 permits demodulation of the interference signals by a direct homodyne method.

The degree of interference among the light pulses at the three-by-three optical coupler 30 is the result of the path length change between M$_1$ and M$_2$ as a result of pressure, acceleration, and temperature. The resulting phase information detected by the photo detectors 34 is then processed by the processor 36 using a T-transform technique. The processor 36 adds the signal B to one-half of the signal A, and adds the signal B to the signal C, to get rectangular coordinates of the time versus value field. The processor 36 then converts the result from rectangular to polar coordinates, using the coordinate transformer chip TMC 2330A, available from the semiconductor division of Raytheon Electronics of San Diego, California. The resulting signal 38, unwrapped, represents seismic energy. In a preferred embodiment, the signal processor 36 comprises a DSP-Sharc processor available from Analog Devices as part number AD8P21062.

In operation, on command, the pulsed laser 20 sends a first pulse of light having a pulse width W into the optical coupler 24 and on through the fiber 12 to the first one of the mirrors 14, i.e. M$_1$, where a small fraction, about 0.5%, is reflected back to the optical coupler 24, while the remaining pulsed energy moves on through the first hydrophone, i.e. the portion of the fiber 12 between M$_1$ and M$_2$. With the input pulse width W less than twice the travel time between M$_1$ and M$_2$, light will travel from M$_1$ to M$_2$ and back to M$_1$, without any phase or frequency modulation of the pulse. When the first pulse of light arrives at M$_3$, the reflected light from M$_2$ will have traveled 12.5 meters towards the optical coupler 24. Thus, when M$_3$ reflects its 0.5% of the pulse, the first pulse will have traveled 25 meters. The difference in length traveled by the first pulse through the first hydrophone, bounded by M$_1$, and M$_2$ and second hydrophone, bounded by M$_2$ and M$_3$, will be 12.5 meters.

The first pulse of light will continue on down the fiber 12, creating reflections at all the remaining intrinsic fiber mirrors 14. Because the distances between the intrinsic fiber mirrors 14 are all equal, the time between all of the reflected pulses will be equal, thus providing a time division multiplexed serial array of sensors.

When the reflected pulses reach the optical coupler 24, fifty percent of the reflected light will travel towards the pulsed laser 20, where the light will be absorbed in an optical isolator (not shown), which is part of the pulsed laser 20. The other fifty percent of the reflected light will travel to the optical coupler 26, where it will split between paths P1 and P2. The returning reflected pulsed light in the path P1 passes through the delay coil 28. The delay coil 28 causes a delay equal in length to the two-way travel time of the distance between the intrinsic fiber mirrors 14. In a preferred embodiment, the delay coil 28 comprises a coiled section of SMF28 fiber available from the Corning Corporation.

As a consequence of the delay coil 28, the reflected light pulse from M$_1$ on path P2 will be delayed to arrive at the optical coupler 30 at the same time as the reflected light pulse from M2 on path P2. As illustrated in FIG. 1A, the pulse at 102 and the pulse at 104 will produce the interfering pulses at 106. With the delay path, the reflected pulses will interfere, as illustrated in FIG. 1A. Because the input light pulses from the pulsed laser 20 are coherent, the interference patterns will indicate the acoustic pressure, temperature, and acceleration effects of the light traveling through a sensor as amplitude differences.

Figure 3A:
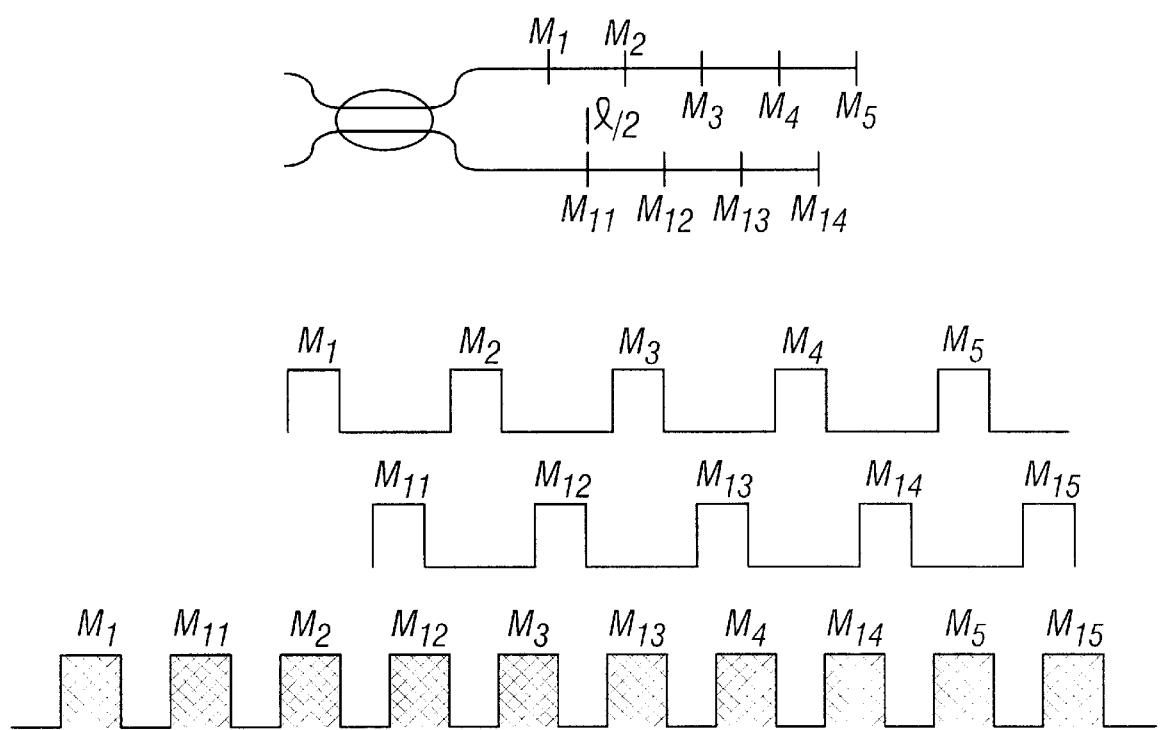
FIG. 3A is a schematic illustration of reflected pulse interference in the sensor system of FIG. 3.
Figure 4:
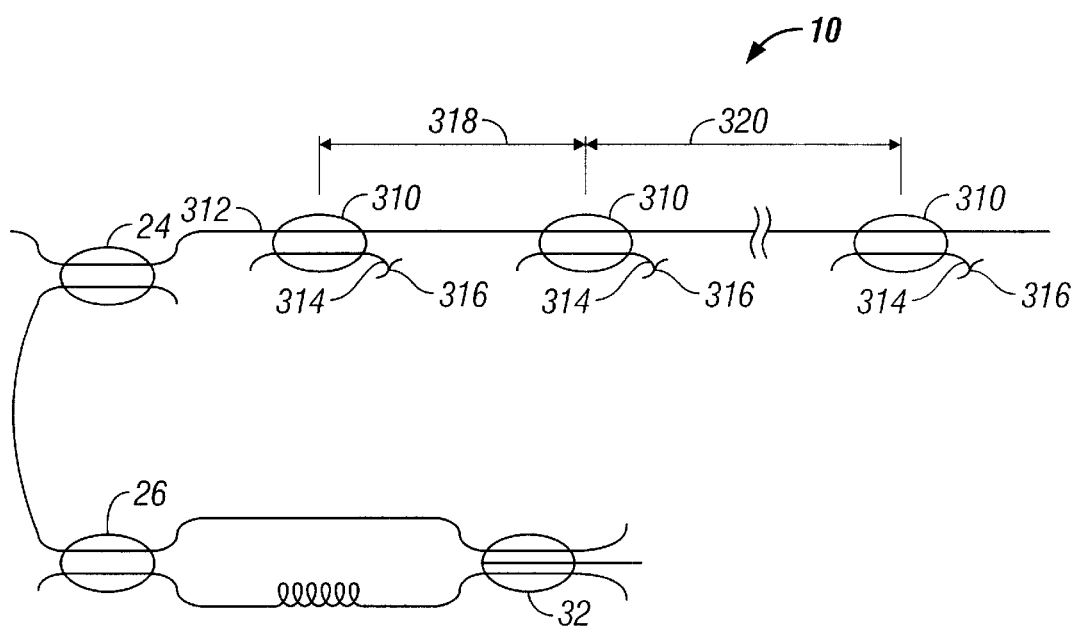
FIG. 4 is a schematic diagram of an alternate embodiment using ratio optical couplers in place of partially reflective mirrors.

In an alternative embodiment, as illustrated in FIG. 4, each hydrophone sensor of the sensor system 10 includes a two-by-two, ratio optical coupler 310, spliced within the long, single mode, continuous fiber 312. The ratio optical coupler 310 sends a small portion of the light pulse, e.g. 0.5%, to a trailing tail 314 of the optical coupler 310. Totally reflective mirrors 316 are embedded in each of the trailing tails 314, by any conventional process for writing such mirrors into optical fibers. In operation, a light pulse travels through the first optical coupler-bound hydrophone 318 where a portion determined by the selected ratio for the optical coupler 310, e.g. 0.5%, is directed via the optical coupler 310 to the first one of the mirrors 316, and the remaining portion, e.g. 99.5%, travels on to the next hydrophone, and so on, through the Nth hydrophone. Each of the reflected portions of the pulses travel back to the optical coupler 24 and on to a compensating interferometer (not shown) similar to the interferometer shown in FIG. 1, where the return signals from each hydrophone N interfere with the signals returned from the next hydrophone N+1 in the linear array, as illustrated in FIG. 3A. Using ratio optical couplers with embedded mirrors may reduce cross talk between signals from successive hydrophones, compared to mirrors written directly into a single continuous fiber.

In a preferred embodiment, a method for optimizing the signal levels returned to the data processor 36, with either the single continuous fiber embodiment of FIG. 1 or the ratio optical coupler embodiment of FIG. 4, is employed which varies the percent of signal returned from each sensor compared to the signal that travels on down the fiber, so that mirrors closest to the pulsed laser 20, i.e. close to the dry end of the streamer, return the lowest percent of signal, and those farthest from the pulsed laser 20 have the highest percent of return. Optimization of mirror reflectances for the single continuous fiber embodiment, and of optical coupler ratios for the ratio optical coupler embodiment, making the best use of the optical power available from the light source, requires tapering the reflectances or ratios from low values near the dry end to high values near the wet end, so that the received signal level is the same from all hydrophones.

In optimizing the mirror reflectance $R_j$ for the j'th hydrophone (J=1 for hydrophone closest to dry end, j=N for hydrophone closest to wet end), we define three loss factors associated with the sensing fiber: F is the fiber length attenuation loss factor, X is the mirror excess loss factor, and $M_j$ is the loss factor for the j'th hydrophone due to mirror reflectance. These are given by $$F = 10^{-\alpha D/10}$$

with α representing the fiber loss in db/km and D representing the center-to center spacing of hydrophones, in km;

$$X = 10^{-B/10},$$

with β the excess loss per mirror in dB, and $$M_j = 1 - R_j$$

For example, if α=0.4 db/km, corresponding to a low-loss fiber at 1.3 μm wavelength, and D=0.125 km, then F=0.9886. If β=0.03 db, then X=0.9931. If $R_j$=0.001 (0.1%), then $M_j$=0.9990.

Considering that, between the light source and the receiver, the light from the j'th sensor passes though all the downstream sensors and the connecting fiber twice, the reflectance of the mirrors in the j−1th sensor which gives the same signal levels from the two sensors at the optical receiver is $$R_j = R_{j-1}/(L^2 X^2 M_{j-1}^2)$$

A summary of exemplary calculated results is given in the Table below. The calculations assume that the maximum mirror reflectance $R_N$=2%=0.02, and that the excess mirror loss X=0.03 dB. The loss factors of 0.4 db/km and 0.25 db/km correspond to minimum fiber losses at 1.3 μm and 1.55 μm, respectively. In the Table, $R_1$ is the excess loss of the mirror closest to the dry end. The excess system loss XSL, given (in db) by $$XSL = -10 \log_{10}(2R_1 N),$$

is an important parameter in the analysis. XSL indicates what portion of the light from the laser is actually utilized at the receiver. It takes into account all the loss factors introduced above: fiber length attenuation, mirror excess loss, and excess loss due to mirror reflectance.

Exemplary results of mirror reflectance optimization are illustrated below:

| Input Parameters | | Output Parameters | |
|---|---|---|---|
| N | α (db/km) | $R_1$ | XSL(dB) |
| 48 | 0.4 | .0041 | 8.61 |
| 48 | .25 | .0042 | 6.79 |
| 96 | .04 | .00157 | 14.56 |
| 96 | .025 | .00163 | 10.89 |

As discussed above, the single fiber embodiments of FIGS. 1 and 4 provide a long gauge, continuous marine hydrophone streamer, including a plurality of hydrophones in one fiber. Alternate embodiments which provide a better sampling rate than the embodiment of FIG. 1 are shown in FIGS. 2 and 3.

Figure 2:
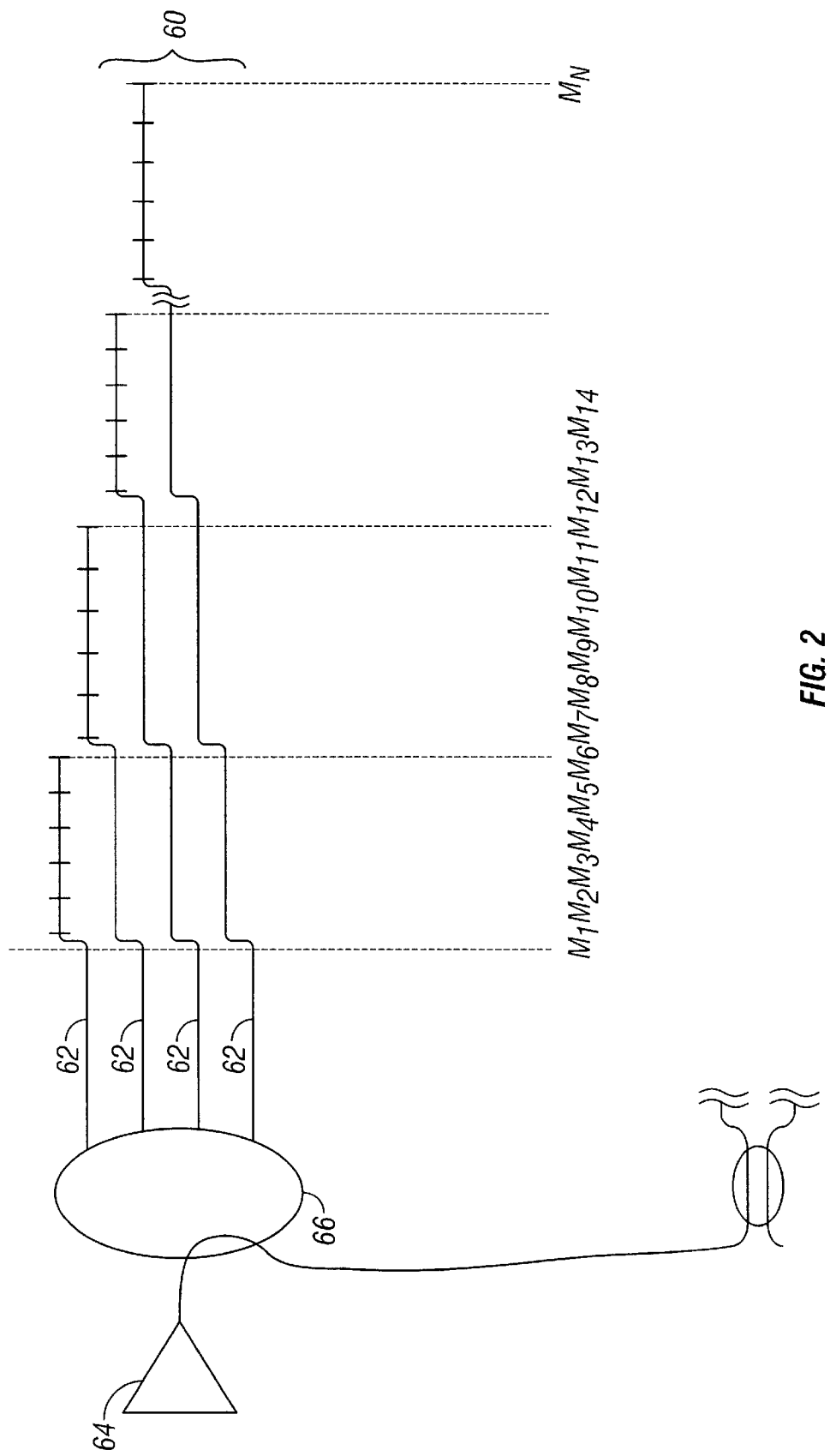
FIG. 2 is a schematic diagram of an alternate embodiment using multiple fibers and groups of mirror-bounded sensors of equal fiber length.

Referring to FIG. 2, a hydrophone streamer 60 includes a plurality of fibers 62 coupled to a single pulsed laser 64 by way of a two-by-N optical coupler 66, where N is the number of hydrophones in the hydrophone streamer 60. In a preferred embodiment, the fibers 62 comprise SMF 28 fibers available from the Corning Corporation. In a preferred embodiment, the two-by-N optical coupler 66 comprises a balanced two-by-N optical coupler available from M.P. Fiber Optic as part number SA1500NONABONE.

Figure 2A:
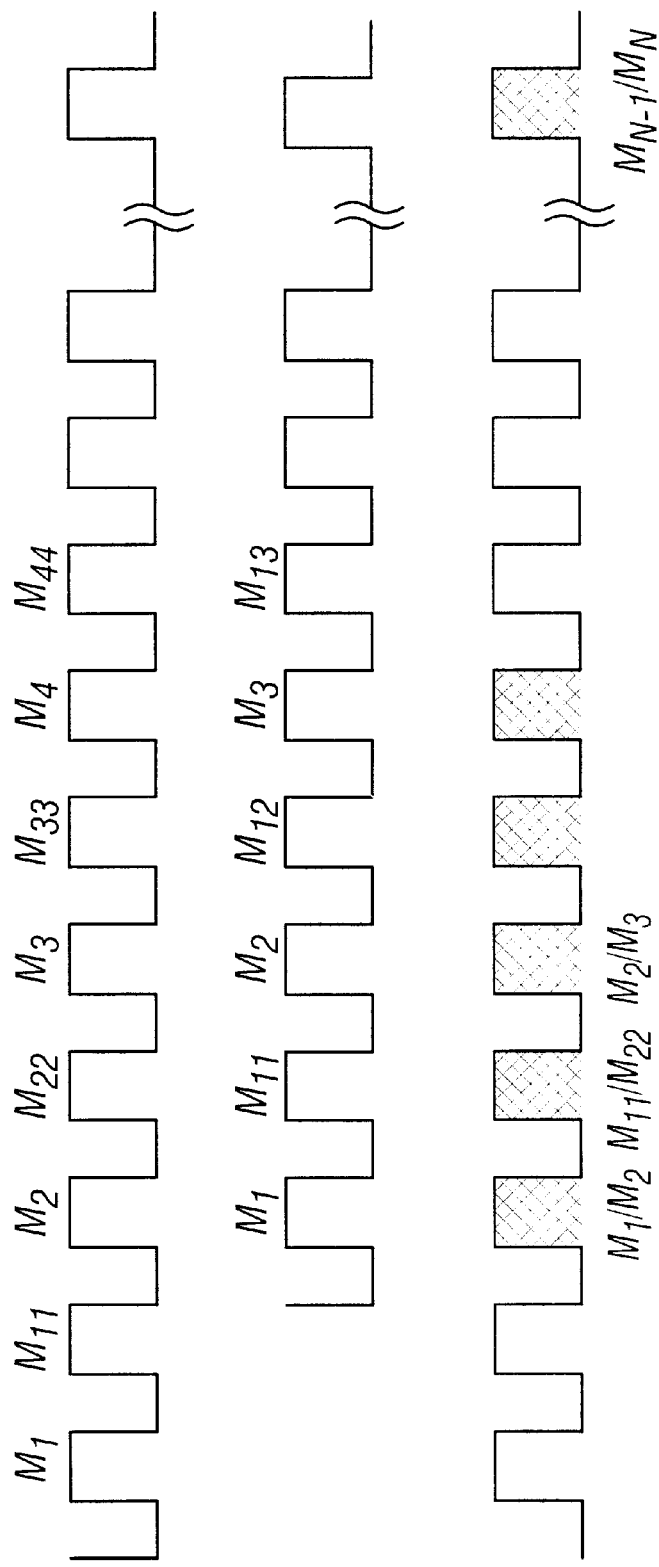
FIG. 2A is a schematic illustration of reflected pulse interference in the sensor system of FIG. 2.

Each of the hydrophones is defined by a pair of spaced internal mirrors $M_N$ and $M_{N+1}$, which can be written into the fibers as discussed above. The embodiment of FIG. 2 will provide interference patterns as shown in FIG. 2A, comparable to the interference patterns provided by the single fiber embodiment of FIG. 1.

Figure 3:
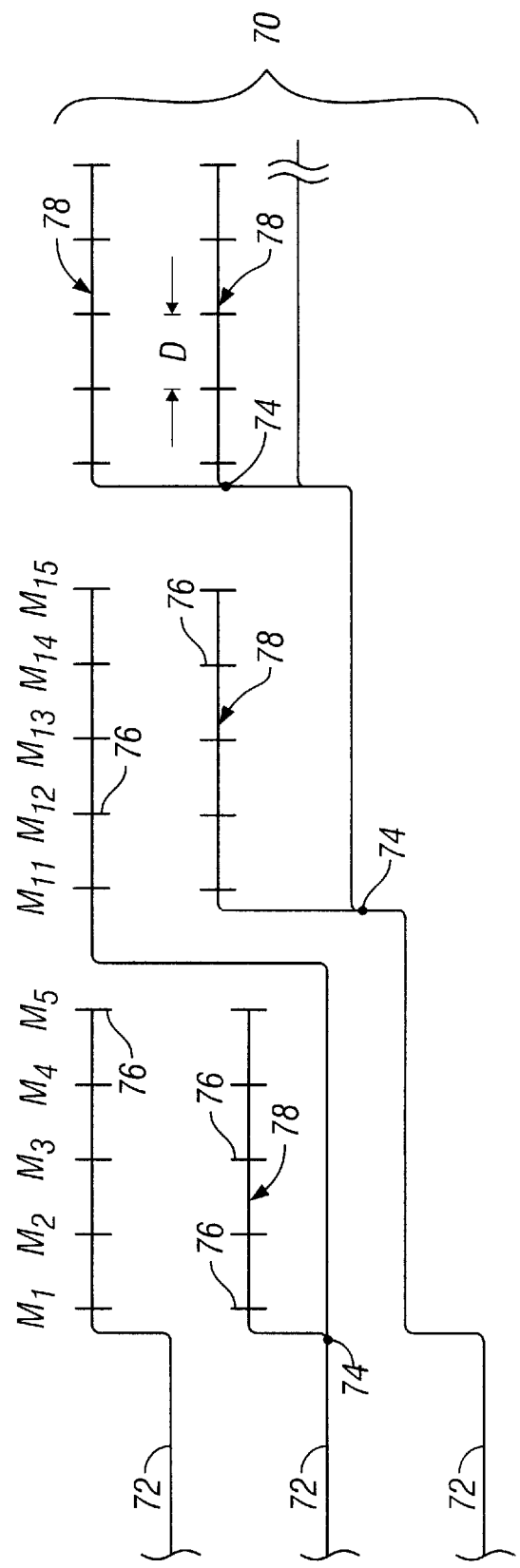
FIG. 3 is a schematic illustration of another alternate embodiment using multiple fibers and groups of mirror-bounded sensors.

Another method for improving the sampling rate is shown in FIG. 3, where varying lengths of an optical fiber 72 are interconnected by way of an optical coupler 74 to place groups of sensors, such as group 78, in overlying parallel relationship. In this manner, the number of sensors for a given length of fiber can be doubled by locating the mirrors in one group a distance D/2 from one another, where D is the distance between adjacent mirrors, as shown in FIG. 3A.

In a preferred embodiment, the optical fiber 72 comprises SMF28 available from the Corning Corporation. In a preferred embodiment, the optical coupler 74 comprises a two-by-two balanced optical coupler available from M.P. Fiber Optics.

Figure 5:
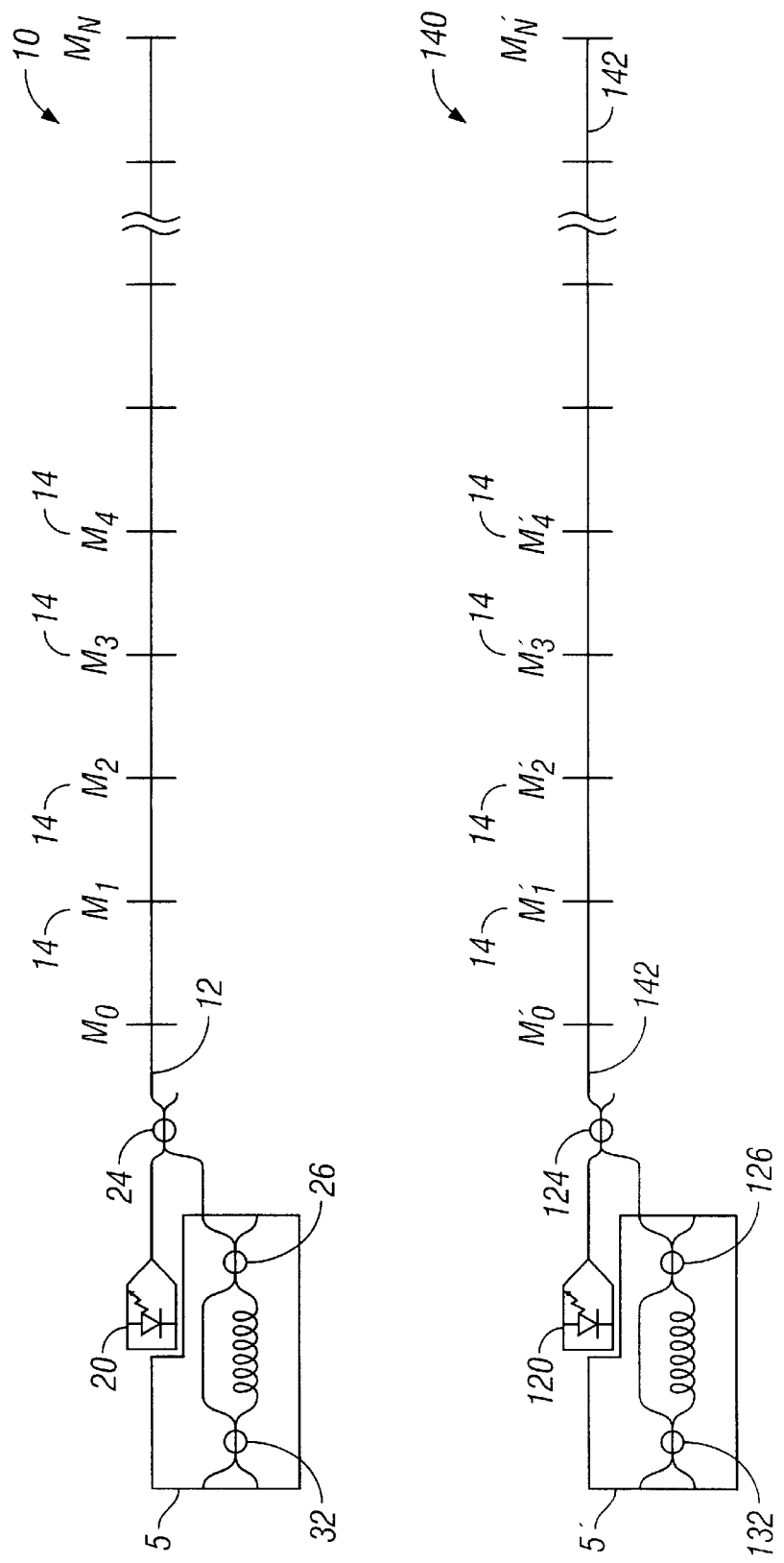
FIG. 5 is a schematic diagram of an acoustically desensitized reference fiber to calibrate any of the embodiments of the invention.

Referring now to FIG. 5, in a preferred embodiment, a reference system 140 is provided in the same package with the system 10. The system 140 includes a continuous single-mode reference fiber 142, identical to the fiber 12, and packaged alongside the fiber 12. The system 140 includes identical integral mirrors $M_1'$ through $M_n'$, and identical optical couplers 124, 126, and 132. The fiber 142 is desensitized to acoustic pressure by encasing it in a non-resilient jacket. The reference fiber 142, being exactly parallel to the fiber 12, is subjected to the same acceleration and temperature effects as the fiber 12. The pulsed laser 20 supplies input signals to a fiber 122, input signals identical to those provided to the fiber 12, thereby providing output signals (not shown) which can be subtracted from the output signals A, B, and C, to provide acoustic pressure data without acceleration and temperature effects. The reference fiber 142 can be desensitized from pressure by any conventional technique such as a metallic coating, or by modification of the glass fiber, to have a core with low bulk modulus and a clad with high bulk modulus. In the preferred embodiment, the reference fiber 142 is desensitized by enclosing it in a stainless steel tube 143 made by Laser Armortec of Los Angeles, Calif.

Figure 5A:
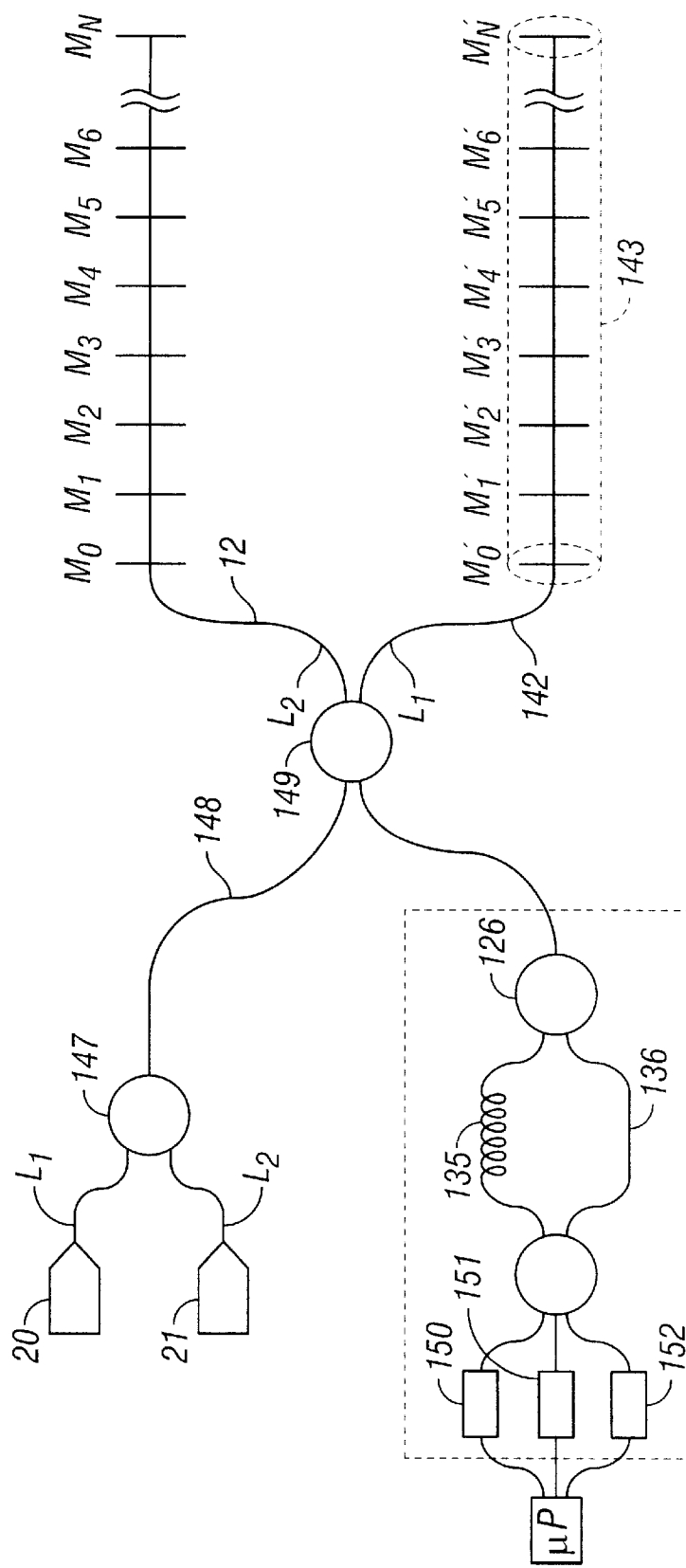
FIG. 5A is a schematic of the preferred acoustically desensitized reference fiber using a WDM coupler.

Referring now to FIG. 5A, an alternate embodiment of the reference system 140 again includes a continuous single-mode reference fiber 142, identical to the fiber 12, and packaged alongside the fiber 12. The reference fiber 142 is desensitized to acoustic pressure, but not desensitized to temperature, vibration, and acceleration. The reference fiber 142, being exactly parallel to the fiber 12, is subjected to the same temperature, vibration, and acceleration effects as the fiber 12. The pulsed laser 20 and another pulsed laser 21 supply input signals, L1 and L2, respectively, to a single-mode fiber 148 through a wave division multiplexer ("WDM") coupler 147. In a preferred embodiment, the WDM coupler 147 comprises a DWF1200015110 coupler available from E-Tek.

The single-mode fiber 148 is interconnected to a 2×2 WDM coupler 149 where the signal L1 is optically coupled to the reference fiber 142, and the signal L2 is optically coupled to the fiber 12. In a preferred embodiment, the WDM coupler 149 comprises a DWF1200015110 coupler available from E-Tek.

The pulsed light L1 will reflect off each mirror $M_0$ to $M_n$ and return to the 2×2 WDM coupler 149. The pulsed light L2 will reflect off each mirror $M_0$ to $M_n$ and return to the 2×2 WDM coupler 149. At the 2×2 WDM coupler 149 the two light signals L1 and L2 will combine, and 50% of the light will travel to the pulsed lasers 20 and 21, and the other 50% of the light will travel to a compensating interferometer 130. The two signals L1 and L2 will traverse a delayed path 135 and an undelayed path 136 to a 3×3 optical coupler 132. In a preferred embodiment, the optical coupler 132 comprises a 3×3 balanced optical coupler available from M.P. Fiber Optics.

In the 3×3 coupler 132, the delayed pulse of each signal (wavelength) will interfere independently with the undelayed pulse of its same wavelength. The two interference patterns, produced by the two wavelengths, will electrically subtract in the photo diodes 150, 151, and 152. In a preferred embodiment, the photo diodes 150, 151 and 152 comprise pin diodes available from PD-LD Corporation.

Thus the common mode effects in the reference fiber 142 and the sensor fiber 12 will cancel. In addition, the undesired effects of temperature, vibration, and acoustics produced in the compensating interferometer will also be common mode and subtract.

Figure 6:
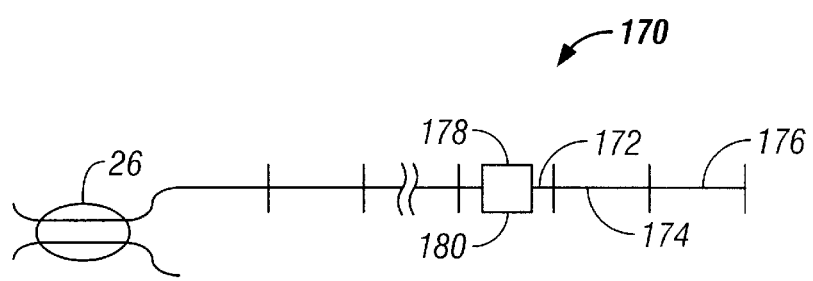
FIG. 6 is a schematic illustration of an alternate calibration system which can be used with any of the embodiments of the invention.

A method for calibrating hydrophone sensor sensitivity, and measuring cable depth, is shown in FIG. 6. In this embodiment, a calibration portion 170 is included in the fiber 12. The calibration portion 170 spans three mirror bounded sections of the fiber 12, namely, sections 172, 174, and 176. The first section 172 includes a fiber stretcher such as, for example, a PZT stretcher 178 having an electrical input lead 180 for coupling to an oscillator (not shown) to provide electrical signals to the PZT stretcher 178. In a preferred embodiment, the stretcher 178 comprises a piezo-ceramic stretcher available from Optiphase Corporation as part number PZ1-15501-100-0.

The next section 174 of the calibration portion 170 is pressure sensitive, and is set for pi radians with 100 pounds per square inch sensitivity. The third section 176 is desensitized in any conventional manner as mentioned above. In this way, when an electrical signal is fed to one end of the PZT stretcher 178, and the output from the other end is detected, the output provides the factor representing the AC sensitivity of the fiber hydrophones with the effects of temperature and pressure removed. The fiber stretcher can be obtained from Optiphase, Inc. of Van Nuys, Calif., as model number PZ1-15501-100-0. In addition, the calibration method permits the cable depth to be calculated from the pressure on the section 174 with effects of temperature removed by the section 176.

As will be appreciated by persons of ordinary skill in the art having the benefit of the present disclosure, Bragg gratings with a wavelength of ±10% of nominal (e.g. 1535 to 1565 nm) can be used in place of low reflectance mirrors. Furthermore, the use of Bragg gratings also allows the use of multi-wavelength lasers pulsing into the fiber 12 at sequential times to permit wave division multiplexing in addition to time division multiplexing. Finally, the use of a mix of Bragg gratings and low reflectivity mirrors simplifies the implementation.

A marine seismic streamer has been described having a continuous, linear set of hydrophone sensors formed from a single continuous optical fiber having internal mirrors. The single fiber functions both as an input fiber and a return fiber. The internal mirrors define the boundaries of the linear, serial array of acoustic sensors. The optical sensor system includes a single mode optical fiber having partially reflective mirrors written into the fiber at predetermined intervals, such that each pair of mirrors defines the boundaries of a single sensor. Acoustic sensitivity is enhanced by enclosing the sensors in a plastic jacket. A pulsed laser of fixed frequency provides optical energy having a pulse width equal to or less than twice the time of travel of optical energy between the predetermined mirror intervals, and a repetition rate less than the reciprocal of twice the travel time between the first and the last mirror in the linear array of sensors. Light reflected back from each partially reflective internal mirror through the same one fiber is split at the same end as the laser input by an optical coupler to pass through two arms of a compensating interferometer, to provide interference patterns for interrogation and conversion to electrical data signals. The compensating interferometer includes a time delay for one arm equal to twice the time of travel between adjacent mirrors.

An optical sensor system has also been described that utilizes a 3×3 optical coupler that demodulates the interference signals by a direct homodyne method. In this manner, the crossfeed is of an optical nature, and none of the acoustic signal is crossfed. Therefore, the crossfeed appears only as noise in the demodulation, and the reflector ratio need only be low enough to allow for adequate dynamic range. The modulation will at peak acoustic amplitudes cause multi-thousand fringe changes in the interference pattern, and thus to achieve dynamic ranges of over 100 dB does not require measuring less than milli-pi radians of phase change. At this level the crossfeed could be as high as −40dB.

An optical sensor system has also been described in which each sensor in the array can act as a reference for the immediately preceding sensor.

An optical sensor system has also been described in which the optical sensor system can be modified to include a second continuous optical fiber, desensitized to the acoustic pressure changes, that can be provided in the same streamer casing with the fiber containing the sensitized, mirror-bounded sensors. The desensitized fiber includes identically spaced internal mirrors, and its feed light is from the same pulsed laser as the sensitized fiber. The desensitized fiber is optically coupled to the sensitized fiber at the input end of each.

An optical sensor system has also been described that uses calibration techniques such as piezoelectric stretchers at various checkpoints along the streamer.

An optical sensor system has also been described that increases the sampling rate from a group of linear sensor arrays, and decreases the number of sensors per fiber, by using several fibers, each fiber including a predetermined number of internal mirrors, at predetermined intervals, with each successive fiber having no mirrors until the predetermined interval past the last mirror in its immediately adjacent fiber, with all fibers being fed by the same pulsed laser.

An optical sensor system has also been described in which the mirrors in successive adjacent fibers are spaced half as far apart as in the single fiber embodiment, with each successive fiber connected to its preceding fiber adjacent to the first mirror of the successive fiber.

A pulsed laser has also been described that includes a ring laser and an optical switch having a single polarization input port, a polarization scrambler and a single polarization output port. The resulting pulsed laser provides a pulsed light with high extinction ratios, low loss, and the ability to operate over a broad range of wavelengths.

As will be recognized by persons of ordinary skill in the art having the benefit of the present disclosure, multiple variations and modifications can be made in the embodiments of the invention. Although certain illustrative embodiments of the invention have been shown and described, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is Claimed Is:

1. An optical sensor system for seismic exploration comprising:
    at least one single mode optical fiber, mounted within a linear casing, the fiber having an input end and an opposite terminal end;
    a plurality of partially reflective intrinsic fiber mirrors incorporated into the fiber at predetermined, spaced intervals within the fiber, each pair of adjacent mirrors defining a long gauge, linear, acoustic sensor;
    a first optical coupler coupled to the input end of the fiber, the optical coupler having a first and a second output port;
    a pulsed laser optically coupled to the first output port of the optical coupler wherein the laser is adapted to provide an optical pulse width equal to or less than twice the one way time of travel of optical energy between the predetermined mirror intervals; a compensating interferometer optically coupled to the second output port of the first optical coupler for receiving optical energy reflected from the internal mirrors, the interferometer including a first path and a second path wherein the second path includes a time delay to the two way time of travel of optical energy between the predetermined mirror intervals; and
    a calibration system for calibrating the sensor system to substantially remove the effects of temperature and acceleration on the optical signal being received by the interferometer, the calibration system including a piezoelectric stretcher incorporated in the fiber, the stretcher having an input terminal for connection to a signal generator and an output terminal for connection to a signal receiver.

2. The system of claim 1 wherein the compensating interferometer is an unbalanced Mach-Zehnder interferometer.

3. The system of claim 1 further comprising a second optical coupler coupled to the compensating interferometer, the second optical coupler being a three by three optical coupler having, and further comprising a photo detector coupled to each of the output terminals of the three by three optical coupler and a signal processor coupled to each of the photo detectors for converting the optically interfering signals to digital data.

4. The system of claim 1 wherein the at least two mirrors is a plurality of mirrors N and the sensor is a plurality of sensors N-1.

5. The system of claim 1 wherein the compensating interferometer is a three-by-three homodyne interferometer.

6. The system of claim 1 wherein the predetermined mirror intervals are each greater than or equal to about 12.5 meters.

7. The system of claim 1, wherein the intrinsic mirrors are Bragg gratings.

8. The system of claim 1, wherein the intrinsic mirrors have a reflectivity that minimizes multiple internal reflections between adjacent mirrors.

9. The system of claim 8 wherein the mirrors have a reflectivity less than about 0.5%.

10. The system of claim I/wherein the single mode optical fiber is a first fiber and the calibration system includes a second single mode optical fiber, mounted within the linear casing, the second fiber having an input end, an opposite terminal end, and a plurality of reflective internal mirrors at the same predetermined, spaced intervals within the second fiber as the mirrors within the first fiber, each pair of mirrors within the second fiber being identical with those in the first fiber, wherein each pair of mirrors in the first fiber defines an acoustic sensor and the second fiber further comprises a shield of acoustically insulating material.

11. The system of claim 1, wherein the system includes a plurality of the single mode optical fibers.

12. The system of claim 11, wherein the single mode fibers are positioned in a parallel and overlapping relation to one another.

13. The system of claim 11, wherein the single mode optical fibers are of different lengths.

14. The system of claim 11, wherein the single mode fibers are positioned in groups of two.

15. The system of claim 14, wherein the single mode fibers within the groups of two are positioned in parallel relation to one another.

16. The system of claim 14, wherein the partially reflective mirrors incorporated into the fibers of the groups of two are offset from one another.

17. An optical sensor system for seismic exploration comprising:
    at least one single mode optical fiber, mounted within a linear, pressure sensitive casing, to form a continuous, linear acoustic sensor, the fiber including an input end and an opposite terminal end and at least two, spaced apart, two-by-two, ratio optical couplers between the fiber's input end and the fiber's terminal end, each ratio coupler having an input fiber having a non-reflective terminal end and an output fiber having an intrinsic fiber reflective terminal end;

a first additional optical coupler coupled to the input end of the single mode fiber, the optical coupler having first and a second output port;

a pulsed laser optically coupled to the first output port of the additional optical coupler wherein the laser is adapted to provide an optical pulse width equal to or less than twice the time of travel of optical energy between the intervals between reflective terminal ends of the ratio optical couplers; and a compensating interferometer optically coupled to the second output port of the first additional optical coupler for receiving optical energy reflected from the reflective terminal ends of the ratio optical couplers, the interferometer including a first path and a second path wherein the second path includes a time delay equal to the two way time of travel of optical energy between the reflective terminal ends of the at least two ratio optical couplers; and a calibration system for calibrating the sensor system to remove the effects of temperature on the optical signal being received by the interferometer, wherein the calibration system includes a piezoelectric stretcher incorporated in the cable, the stretcher having an input lead for connection to a signal generator and an output end for connection to a signal receiver.

18. The system of claim 17 wherein the compensating interferometer is an unbalanced Mach-Zehnder interferometer.

19. The system of claim 17 further comprising a second optical coupler coupled to the compensating interferometer second optical coupler being a three-by-three optical coupler, the system further comprising a photo detector coupled to each of the output terminals of the three-by-three optical coupler and a signal processor coupled to each of the photo detectors for converting the optically interfering signals to digital data.

20. The system of claim 17 wherein the at least two ratio optical couplers is a plurality of ratio optical couplers N, wherein each pair of adjacent ratio optical couplers defines a discrete acoustic sensor such that the sensor system includes N−1 acoustic sensors.

21. The system of claim 17 Wherein the compensating interferometer is a three-by-three homodyne interferometer.

22. The system of claim 17 wherein the spacing between the ratio optical couplers is greater than or equal to about 12.5 meters.

23. The system of claim 17 wherein the reflectivity of the reflective terminal ends of the ratio optical couplers is nearly 100 percent.

24. The system of claim 17, wherein the single mode optical fiber is a first optical fiber, the pulsed laser is a first pulsed laser, and the at least two spaced apart two-by two ratio optical couplers is a plurality of two-by-two optical couplers comprising a first set of two-by-two ratio optical couplers and wherein the calibration system includes a second single mode optical fiber, mounted within the linear casing, the second fiber having an input end and an opposite terminal end, the second fiber further including a second set of two-by-two ratio optical couplers of the same configuration and spacing as the ratio optical couplers in the first set, the calibration system further including a second pulsed laser and a second additional optical coupler, the second pulsed laser being optically coupled to the first output port of the second additional optical coupler wherein the second laser is adapted to provide an optical pulse width equal to or less than twice the time of travel of optical energy between the intervals between reflective terminal ends of the second set of ratio optical couplers.

25. The system of claim 17, wherein the system includes a plurality of the single mode optical fibers.

26. The system of claim 25, wherein the single mode fibers are positioned in a parallel and overlapping relation to one another.

27. The system of claim 25, wherein the single mode optical fibers are of different lengths.

28. The system of claim 25, wherein the single mode fibers are positioned in groups of two.

29. The system of claim 28, wherein the single mode fibers within the groups of two are positioned in parallel relation to one another.

30. The system of claim 28, wherein the two-by-two ratio optical couplers incorporated into the fibers of the groups of two are offset from one another.

* * * * *